April 9, 1929.  C. B. WRIGHT  1,708,820
ACCELERATOR PEDAL
Filed Jan. 18, 1928
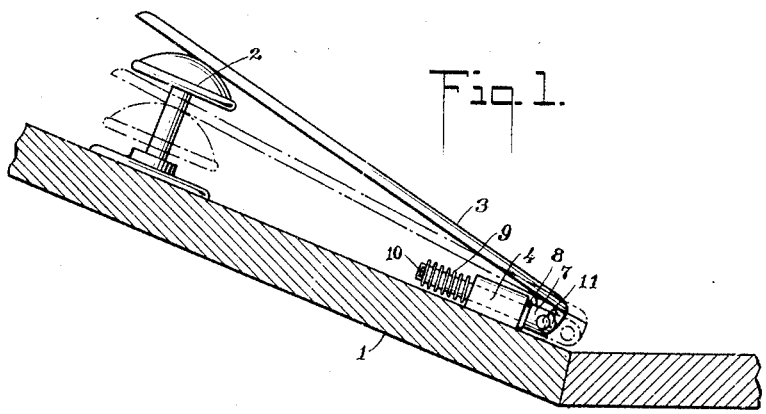
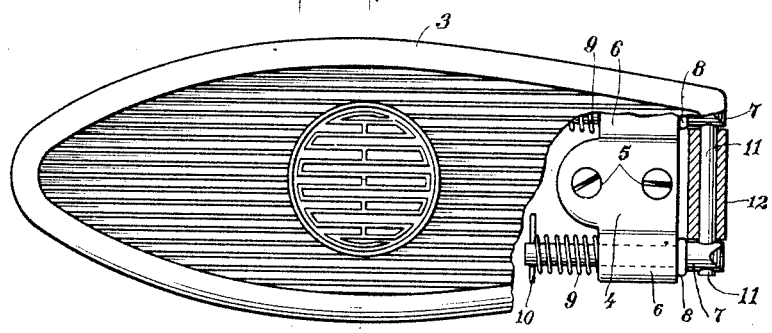
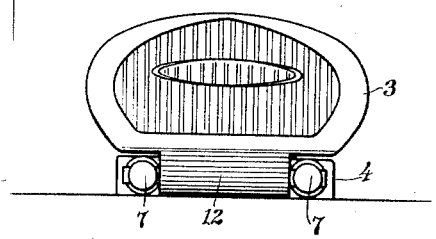
WITNESSES
INVENTOR
Charles B. Wright
BY
ATTORNEY Patented Apr. 9, 1929.

1,708,820

UNITED STATES PATENT OFFICE.

CHARLES B. WRIGHT, OF JERSEY CITY, NEW JERSEY, ASSIGNOR TO ACCELRITE MANUFACTURING CO. INC., OF HARRISON, NEW JERSEY, A CORPORATION OF NEW JERSEY.

ACCELERATOR PEDAL.

Application filed January 18, 1928. Serial No. 247,709.

This invention relates to an accelerator pedal which is primarily adapted for use on automobiles in connection with the accelerator button.

An object of the invention is to provide a pedal of this character which when in operative position provides an easy and comfortable rest for the foot, and which when depressed will cause the accelerator pedal to be depressed, and which will maintain a non-rubbing or non-frictional contact with the button due to the fact that the pedal has longitudinal resilient movement in addition to its pivotal movement.

A further object is to provide a pedal of this character which may be readily attached to an automobile, and which includes a support for the pedal to which the pedal is pivotally connected, and is also resiliently connected so as to allow the pedal to move longitudinally as well as pivotally.

With these and other objects in view, the invention consists in certain novel features of construction and combinations and arrangements of parts, which will be more fully hereinafter described and pointed out in the claims.

In the accompanying drawings—

Figure 1 is a fragmentary view in section of a portion of an automobile, showing my improved pedal in operative position in connection with the accelerator button of the automobile;

Figure 2 is a view, mainly in plan but partly broken away and in section, illustrating the pedal and its mounting;

Figure 3 is an end view of the pedal.

1 represents an automobile and 2 an accelerator button with which automobiles are ordinarily equipped. 3 represents my improved pedal which may be ornamented and shaped as desired and be made of any suitable material although it is preferably of aluminum or other light material.

4 represents a block which constitutes a support for the pedal 3. This block may be secured to the automobile by screws 5 or other suitable attaching means, and is formed at opposite sides with parallel sleeves 6 in which parallel rods 7 are movable. These rods 7 have shoulders 8 thereon which limit the movement of the rods in one direction and coiled springs 9 are located on the rods and bear at one end against the sleeves 6 and at their other ends against cross pins or other devices 10, secured or located in the rods 7 so as to exert a pull on the rods tending to normally hold the shoulders 8 against the sleeves 6.

The rods 7 at their rear ends are connected by a cross pin 11, and this cross pin 11 is projected through a bearing sleeve 12 which is integral with one end of the pedal 3.

It is to be understood that the springs 9 are sufficiently strong to hold the pedal in normal position but permit the pedal a longitudinal movement when pressure is applied thereto. Figure 1 illustrates the normal position of the pedal with its free end resting on the accelerator button 2, and when the pedal is depressed, as indicated by dot and dash lines in Figure 1 it will be noted that the pedal is permitted a longitudinal movement by reason of the construction above described, so that the under face of the pedal has no sliding movement on the button and hence there is no wear on the button or on the pedal, no noise incident thereto, and no material frictional resistance to the depression of the button by the pedal. When pressure on the pedal is relieved, the springs 9 cause the pedal to follow with the button 2 and maintain a constant point of contact with the surface of the button.

Various changes and alterations might be made in the general form of the parts described without departing from my invention and hence I do not limit myself to the precise details set forth but consider myself at liberty to make such changes and alterations as fairly fall within the spirit and scope of the appended claims.

I claim:

1. The combination with a pedal and a support therefor, said support comprising a block adapted to be fixedly secured and having parallel sleeves thereon, longitudinally positioned rods movable in the sleeves, springs exerting pressure on said rods tending to move them forwardly, and said pedal pivotally connected to the rear ends of said rods.

2. The combination with a pedal and a support therefor, said support comprising a block adapted to be fixedly secured and having parallel sleeves thereon, longitudinally positioned rods movable in the sleeves, springs exerting pressure on said rods tending to move them forwardly, and a pin connecting the rear ends of said rods, and said pedal at its rear end having a bearing sleeve receiving the pin.

3. The combination with a pedal and a support therefor, said support comprising a block adapted to be fixedly secured and having parallel sleeves thereon, longitudinally positioned rods movable in the sleeves, springs exerting pressure on said rods tending to move them forwardly, a pin connecting the rear end of said rods, and said pedal at its rear end having a bearing sleeve receiving the pin, and shoulders on the rods between the bearing sleeve and the support and engaging the ends of the sleeve to limit the forward movement of the pedal.

Signed at Elizabeth, N. J., in the county of Union and State of New Jersey, this 16 day of January A. D. 1928.

CHARLES B. WRIGHT.